UNITED STATES PATENT OFFICE.

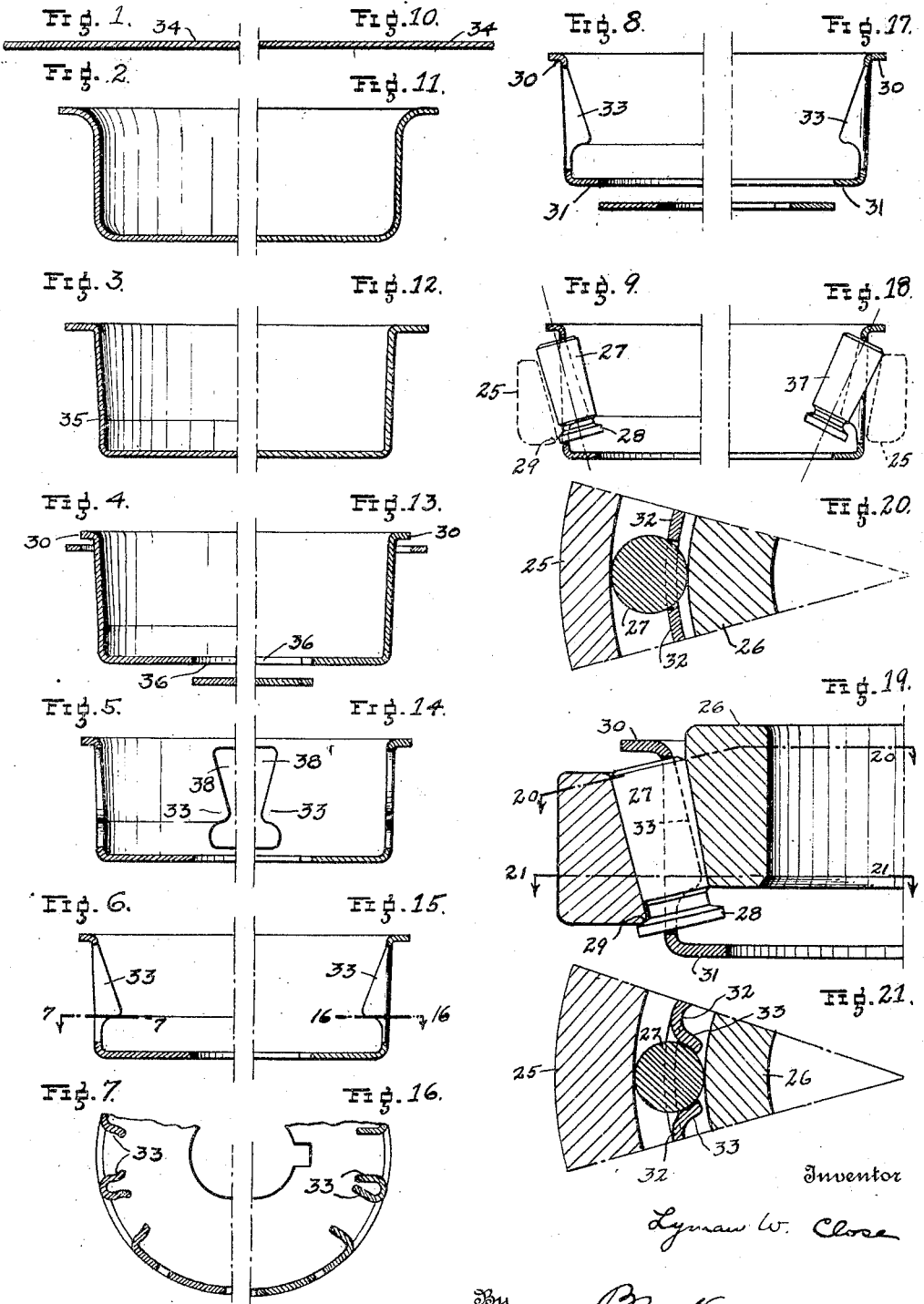

LYMAN W. CLOSE, OF TOLEDO, OHIO, ASSIGNOR TO THE BOCK BEARING COMPANY, OF TOLEDO, OHIO, A CORPORATION OF OHIO.

ROLLER BEARING.

1,427,520.     Specification of Letters Patent.   Patented Aug. 29, 1922.

Application filed January 19, 1922. Serial No. 530,396.

*To all whom it may concern:*

Be it known that I, LYMAN W. CLOSE, a citizen of the United States, and a resident of Toledo, county of Lucas, State of Ohio, have invented certain new and useful Improvements in Roller Bearings, of which the following is a specification.

This invention relates to anti-friction bearings, and more particularly to a novel cage construction for retaining the rollers in assembled relation with the outer race member of the bearing, and to a novel method of permanently assembling the race member with the rollers and cage.

One of the objects of the invention is to provide a cage of comparatively simple construction which can be manufactured economically from a single piece of sheet metal and which will permit of permanently assembling the rollers with the outer race member or cup so as to produce a relatively narrow bearing which will have adequate rolling surfaces to meet the requirements as to radial and thrust loads which such bearings encounter in service.

Other objects of the invention and the features of novelty will be apparent from the following description taken in connection with the accompanying drawings, of which:

Figure 1 is a transverse section of a metal blank from which a cage embodying the invention is formed;

Figs. 2 to 6, inclusive, are transverse sections of the cage in different stages of one method of manufacture;

Fig. 7 is a section on the line 7—7 of Fig. 6;

Fig. 8 is a view similar to Figs. 2 to 6 but indicating the next operation;

Fig. 9 is a view similar to Fig. 8 but showing the method of assembling the rollers and cup, with the cage;

Fig. 10 is a view similar to Fig. 1 but showing the blank used in another method of manufacturing the cage;

Figs. 11 to 15, inclusive, show various steps in forming the cage by such other method;

Fig. 16 is a section on the line 16—16 of Fig. 15;

Fig. 17 is a view similar to Figs. 11 to 15 but showing the next operation;

Fig. 18 is a view similar to Fig. 9 but showing the different method of assembling the rollers and cup, with the cage;

Fig. 19 is an enlarged transverse section of one-half of a completed bearing;

Fig. 20 is a transverse section on the line 20—20 of Fig. 19; and

Fig. 21 is a similar section on the line 21—21 of Fig. 19.

Referring to the drawings, and more particularly, for the present, to Figs. 19 to 21, it will be noted that the outer race member or cup is indicated at 25, and the inner race member or cone is indicated at 26. A circumferentially spaced series of tapered rollers 27 is arranged between the cup 25 and the cone 26, according to the customary practice in the tapered roller bearing art, but in the present illustration, each of the rollers is provided with a flange 28 at the smaller end of its tapered body, the inner side of this flange engaging one of the side faces of the cup 25, at the corner 29.

According to the present invention, the bearing is made up of two units, one unit comprising the cup 25 with the cage and rollers assembled therewith, and the other unit consisting of the cone 26 which is readily separable from the other parts of the bearing.

The cage consists of a sheet metal shell comprising end flanges 30 and 31, one of which is turned outwardly and the other turned inwardly, and these flanges are connected by a series of roller-spacing bridging members 32 so formed as to provide tapered pockets for the rollers. The narrower ends of these pockets receive the larger ends of the tapered bodies of the rollers and are somewhat less in width than the diameter of the rollers, as will be seen from Fig. 20, so that the larger ends of the rollers will not pass through these narrower ends of the pockets. The wider ends of the pockets receive the smaller ends of the rollers and the rollers are held in the pockets by means of the inwardly projecting wings 33, which partially surround the rollers.

From Fig. 19, it will be evident that the flanges 28 of the rollers and the wings 33 cooperate to retain the rollers, the cup, and the cage in permanently assembled relation.

While it is realized that it is possible to produce the cage illustrated, by different methods, it is believed that the methods about to be described are economical and commercially practicable and well illustrate the principles of my invention.

According to the method illustrated in Figs. 1 to 9, I start with a circular disc 34 which, in the first operation, will be drawn into the form illustrated in Fig. 2 by means of suitable dies in a stamping press. I have not illustrated the dies for performing this operation, or for any of the subsequent operations, for the reason that the character of these dies will be readily understood by those skilled in the art, from the nature of the operations that are to be performed.

The next operation is to re-strike the cup illustrated in Fig. 2 to square up the corners and to provide a bend in the side wall as indicated at 35. By the succeeding operation the outwardly extending flange 30 is trimmed and an opening 36 is formed at the center of the bottom wall to receive the arbor of an indexing fixture. The cup is then placed on an indexing fixture and by means of suitable punching dies the roller openings 38 are punched in the side wall, as shown in Fig. 5. In this figure only one-half of the roller opening is indicated but it will be understood that the other half of the opening is similar to that shown, and that the number of openings formed will equal the number of rollers that will be used in the bearing.

The next operation turns the wings 33 inwardly, as indicated in Figs. 6 and 7, and also gives to the wings the proper shape to conform to the tapered body of the roller.

The succeeding operation is indicated in Fig. 7 and consists in punching out the surplus metal of the bottom so as to form the flange 31.

The rollers are then placed in the pockets as indicated in Fig. 9, the flanged end of the roller being displaced inwardly from its ultimate position in order to permit the cup 25 to be passed over the flanges 28. When the cup 25 is in position the rollers are swung out so that the inner face of the flange 28 will engage with the corner 29 of the cup and the body of the roller will engage with the rolling surface of the cup. The bridging members 32 are then pushed outwardly to cause the wings 33 to more closely surround the bodies of the rollers and thus retain the parts in their assembled position. In thus pushing out the bridging members the bend at the point 35 is eliminated and the resulting structure will be substantially as illustrated in Fig. 19.

In the method of forming the cage, which is illustrated in Figs. 10 to 18, inclusive, a blank 34, similar to that used in the former case, is used, and this blank is first drawn into a cup, as shown in Fig. 11, this cup being practically the same as illustrated in Fig. 2. The cup is then re-struck to square up the corners and to produce a substantially cylindrical side wall. By the next operation the flange 30 is trimmed and the opening 36 for the indexing fixture is produced. By the succeeding operation, the openings for the rollers are formed, as illustrated in Fig. 14, these openings being substantially the same as indicated in Fig. 5. In the next operation the wings 33 are turned inwardly but, in this method, the wings are not fashioned to the shape of the body of the roller, the difference being apparent by a comparison of Fig. 16 with Fig. 7. The next operation completes the cage, prior to assembly, by punching out the bottom wall to form the flange 31.

In this method the rollers are assembled in the pockets, from the outside, as shown in Fig. 18, the straight wings, as indicated in Fig. 16, permitting the flanged ends of the rollers to swing inwardly more than they can in Fig. 9. The cup 25 is then moved axially into position, engaging the larger ends of the tapered bodies of the rollers, and swinging the flanged ends of the rollers outwardly to their ultimate position. By suitable dies the wings 33 are then bent around the bodies of the rollers and thus made to conform thereto, sufficient clearance being, of course, allowed to permit the roller to turn freely. This completes the assembly of this unit of the bearing and the bearing will be complete and ready for operation when the cone 26 is inserted.

It will be noted that the above-described methods start with the same blank and produce the same final result, and it will be evident to those skilled in the art, that various changes may be made in the details of construction and the operations in producing the cage, without departing from the spirit of the invention which is defined in the appended claims.

Having thus described my invention, what I claim is:

1. In a tapered roller bearing, the combination of the outer race member, a series of rollers parmanently assembled therewith and each having a flange on the smaller end of its body, said roller flanges engaging one of the side faces of said race member, and a cage for said rollers comprising end flanges, roller spacing bridging members connecting said flanges and interiorly arranged wings on the opposite edges of said bridging members.

2. In a tapered roller bearing, the combination of the outer race member, a series of rollers permanently assembled therewith and each having a flange on the smaller end of its body, said roller flanges engaging one of the side faces of said race member, and a cage for said rollers comprising end flanges, roller spacing bridging members connecting said flanges and extending substantially parallel with the axis of the bearing, and interiorly arranged wings on the opposite edges of said members partially surrounding the smaller ends of the roller bodies.

3. A one-piece cage for tapered rollers consisting of end flanges and roller-spacing bridging members connecting said flanges and so shaped as to form roller openings reversely tapered with respect to the rollers to be received therein, and interiorly arranged wings on the opposite edges of said bridging members.

4. A one-piece cage for tapered rollers consisting of end flanges and roller-spacing bridging members connecting with the inner edge of one of said flanges and with the outer edge of the other flange, said bridging members being so shaped as to form roller openings reversely tapered with respect to the rollers to be received therein and having wings along their opposite edges projecting into the interior of the cage.

5. The hereindescribed method of permanently assembling a series of tapered rollers, having flanges on their smaller ends, with the outer race member of a roller bearing and a cage that is provided with end flanges and roller-spacing bridging members connecting said flanges forming roller spaces therebetween, said members having wings along their opposite edges projecting inwardly, which consists in first inserting the rollers in the roller spaces on the outside of the cage with the larger end of the body of the rollers in narrower end of said spaces, swinging the flanged ends of the rollers through said spaces to a position inwardly of their final position, positioning the outer race member, moving the flanged ends of the rollers outwardly into contact with the rolling surface of the outer race member and with the roller flanges engaging a side face of said member, and then closing said wings around the rollers to retain them in position.

In testimony whereof I affix my signature.

LYMAN W. CLOSE.